US010779118B2

(12) United States Patent
Duan et al.

(10) Patent No.: US 10,779,118 B2
(45) Date of Patent: Sep. 15, 2020

(54) MEDIA ACCESS CONTROL (MAC) FRAME STRUCTURE AND DATA COMMUNICATION METHOD IN A REAL-TIME LOCALIZATION SYSTEM

(71) Applicant: RED POINT POSITIONING CORPORATION, Brookline, MA (US)

(72) Inventors: Chunjie Duan, Brookline, MA (US); Georgiy Pekhteryev, Kharkov (UA); Oleg Mitin, Kharkov (UA); Zhenzhen Ye, Littleton, MA (US)

(73) Assignee: Red Point Positioning Corporation, Boston, MA (US)

( * ) Notice: Subject to any disclaimer, the term of this patent is extended or adjusted under 35 U.S.C. 154(b) by 0 days.

(21) Appl. No.: 16/246,364

(22) Filed: Jan. 11, 2019

(65) Prior Publication Data

US 2019/0222959 A1 Jul. 18, 2019

Related U.S. Application Data

(60) Provisional application No. 62/616,815, filed on Jan. 12, 2018.

(51) Int. Cl.
*H04W 4/02* (2018.01)
*G01S 5/00* (2006.01)
(Continued)

(52) U.S. Cl.
CPC ............. *H04W 4/023* (2013.01); *G01S 1/02* (2013.01); *G01S 5/00* (2013.01); *G01S 5/08* (2013.01);
(Continued)

(58) Field of Classification Search
CPC ... H04W 4/023; H04W 56/00; H04W 64/003; H04W 56/001; H04W 84/12;
(Continued)

(56) References Cited

U.S. PATENT DOCUMENTS

2010/0074133 A1* 3/2010 Kim .................... H04J 3/0682
370/252
2013/0301551 A1 11/2013 Ghosh et al.
(Continued)

OTHER PUBLICATIONS

International Search Report and Written Opinion of the International Searching Authority for PCT Application No. PCT/US2019/013357, dated Mar. 14, 2019 (15 pages).

*Primary Examiner* — Michael Y Mapa
(74) *Attorney, Agent, or Firm* — Guntin & Gust, PLC; Andrew Gust

(57) ABSTRACT

Systems and methods for locating a position of a mobile device are provided. The system can include a plurality of anchors. Each anchor can be positioned at a fixed location. The plurality of anchors can be configured to communicate with one another and with the mobile device by transmitting data packets formatted according to a media access control (MAC) frame structure. The MAC frame structure can include a beacon period for synchronizing the plurality of anchors in the system via transmission of a first set of communication packets. The MAC frame structure can include a contention-free period. The MAC frame structure can include a contention period. The system can include a position estimator configured to estimate the position of the mobile device.

17 Claims, 7 Drawing Sheets

(51) Int. Cl.
 *H04W 56/00* (2009.01)
 *G01S 5/10* (2006.01)
 *G01S 1/02* (2010.01)
 *G01S 5/08* (2006.01)
 *G01S 5/14* (2006.01)
 *H04W 64/00* (2009.01)
 *H04W 84/12* (2009.01)
 *H04W 74/02* (2009.01)

(52) U.S. Cl.
 CPC ............... *G01S 5/10* (2013.01); *G01S 5/145* (2013.01); *H04W 56/00* (2013.01); *H04W 64/003* (2013.01); *H04W 56/001* (2013.01); *H04W 84/12* (2013.01)

(58) Field of Classification Search
 CPC .. H04W 74/02; G01S 5/10; G01S 5/00; G01S 5/145; G01S 5/08; G01S 1/02
 USPC .............................................. 455/456.1–457
 See application file for complete search history.

(56) References Cited

U.S. PATENT DOCUMENTS

2017/0041750 A1* 2/2017 Jose ........................ G01S 5/10
2017/0195109 A1* 7/2017 Perez-Cruz ............... G01S 5/02

* cited by examiner

MEDIA ACCESS CONTROL (MAC) FRAME STRUCTURE AND DATA COMMUNICATION METHOD IN A REAL-TIME LOCALIZATION SYSTEM

CROSS-REFERENCE TO RELATED APPLICATIONS

This application claims priority to U.S. Provisional Patent Application No. 62/616,815, filed on Jan. 12, 2018 and entitled "MEDIA ACCESS CONTROL (MAC) FRAME STRUCTURE AND DATA COMMUNICATION METHOD IN A REAL-TIME LOCALIZATION SYSTEM," which is incorporated herein by reference in its entirety.

FIELD OF THE DISCLOSURE

This disclosure relates generally to a wireless network, and more particularly, to a media access control (MAC) frame structure and a data communication method for locating mobile devices in a wireless real-time localization system (RTLS).

BACKGROUND OF THE DISCLOSURE

In many applications, it may be desirable to estimate a location of a target object. In some implementations, a system may be designed to allow a target to carry out location estimation using radio frequency (RF) signals, e.g., a wireless device may estimate its location using signal strength of RF signals received from anchors in fixed locations. Other objects may obstruct the path between the target and the anchors, thereby interfering with the RF signals.

SUMMARY OF THE DISCLOSURE

At least one aspect of this disclosure is directed to a system for locating a position of a mobile device. The system can include a plurality of anchors. Each anchor can be positioned at a known location. The plurality of anchors can be configured to communicate with one another and with the mobile device by transmitting data packets formatted according to a media access control (MAC) frame structure. The MAC frame structure can include a beacon period for synchronizing the plurality of anchors in the system via transmission of a first set of communication packets. The MAC frame structure can include a contention-free period. The MAC frame structure can include a contention period. The system can include a position estimator configured to estimate the position of the mobile device.

In some implementations, the MAC frame structure can further include a sync period for the plurality of anchors to synchronize a start of the contention-free period with each other and an ending period. In some implementations, the beacon period of the MAC frame structure can be partitioned into a plurality of time slots for transmitting a beacon signal.

In some implementations, a first anchor of the plurality of anchors can be configured to transmitting a first beacon signal in a first time slot. The first anchor can also be configured to measuring a first time shift between transmission of the first beacon signal and a start of the first time slot. The first anchor can also be configured to receive a second beacon signal from a second anchor transmitted during a second time slot. The first anchor can also be configured to measure a second time shift between receiving the second beacon signal and the start of the second time slot. The first anchor can also be configured to determine a time difference between the first time shift and the second time shift. The first anchor can also be configured to adjust a clock signal of the first anchor based on the time difference. In some implementations, this functionality can also be performed by other anchors in the system in a similar manner to allow the other anchors to adjust their clocks such that the clocks of the other anchors become synchronized. In some implementations, this functionality can be performed by every anchor in the system in a similar manner to allow every anchor in the system to adjust its clock such that the clocks of the all anchors become synchronized.

In some implementations, the contention-free period of the MAC frame structure can be partitioned into a plurality of time slots for transmitting TDOA ranging packets. In some implementations, the MAC frame structure can further include a respective guard interval between successive time slots of the contention-free period.

In some implementations, the plurality of anchors can be grouped into a plurality of anchor pairs. Each anchor pair of the plurality of anchor pairs can include at least two anchors of the plurality of anchors. Each anchor pair can be assigned to a respective one of the plurality of time slots in the contention-free period. During each of the plurality of time slots, a first anchor can be configured to transmit a range request (REQ) packet. A second anchor can be configured to transmit a range response (RSP) packet, responsive to receiving the REQ packet. The mobile device can be configured to calculate a time difference between receiving the RSP packet and the REQ packet. The position estimator can be configured to estimate the position of the mobile device based on the time differences from at least three anchor pairs.

In some implementations, during the contention period of the MAC frame structure, the mobile device can be configured to transmit a first range request (REQ) packet to be received by at least a first subset of the plurality of anchors. At least one anchor of the subset of the plurality of anchors can be configured to transmit a range response (RSP) packet to be received by at least a second subset of the plurality of anchors, responsive to receiving the REQ packet. In some implementations, the at least one anchor may transmit the RSP packet only during the contention period. Each anchor included in both the first subset and the second subset can be configured to calculate a time difference between receipt of the REQ packet and receipt of the RSP packet. The position estimator can be configured to collect the time differences and estimate the position of the mobile device based on the time differences.

In some implementations, during the contention period of the MAC frame structure, for each anchor of at least a subset of the plurality of anchors, the mobile device can be configured to transmit a range request (REQ) packet to the anchor. The anchor can be configured to transmit a range response (RSP) packet to the mobile device, responsive to receiving the REQ packet. The mobile device can be configured to calculate a time difference between receiving the RSP packet from the anchor and transmitting the REQ packet. The mobile device can be configured to estimate a distance between the mobile device and the anchor. The position estimator can be configured to estimate the position of the mobile device based on the distances between the mobile device and at least three anchors.

In some implementations, during the contention period of the MAC frame structure, each anchor of the plurality of anchors can be configured to transmit a respective ranging request (REQ) packet to the mobile device. The mobile device can be configured to transmit respective ranging response (RSP) packets to each anchor of the plurality of anchors, responsive to receiving the respective REQ packets, to cause at least a subset of the plurality of anchors to receive the respective RSP packets. Each anchor of the subset of anchors can be configured to calculate a time difference between receipt of the respective RSP packet and transmission of the REQ packet, and to estimate a distance between the mobile device and the anchor. The position estimator can be configured to estimate the position of the mobile device based on the distances between the mobile device and at least three anchors.

At least another aspect of this disclosure is directed to a method for locating a position of a mobile device in a network of a plurality of anchors at known locations. The method can include establishing a media access control (MAC) frame structure for transmitting data packets between the plurality of anchors and the mobile device. The MAC frame structure can include a beacon period for synchronizing the plurality of anchors. The beacon period of the MAC frame structure can be partitioned into a plurality of time slots for transmitting a beacon signal. The MAC frame structure can include a contention-free period. The MAC frame structure can include a contention period. The method can include transmitting, by a first anchor of the plurality of anchors, a first beacon signal in a first time slot. The method can include measuring, by the first anchor, a first time shift between transmission of the first beacon signal and a start of the first time slot. The method can include receiving, by the first anchor, a second beacon signal from a second anchor transmitted during a second time slot. The method can include measuring, by the first anchor, a second time shift between receiving the second beacon signal and a start of the second time slot. The method can include determining, by the first anchor, a time difference between the first time shift and the second time shift. The method can include adjusting, by the first anchor, a clock signal of the first anchor based on the time difference. In some implementations, this functionality can also be performed by other anchors in the system in a similar manner to allow the other anchors to adjust their clocks such that the clocks of the other anchors become synchronized. In some implementations, this functionality can be performed by every anchor in the system in a similar manner to allow every anchor in the system to adjust its clock such that the clocks of the all anchors become synchronized.

In some implementations, the MAC frame structure can further include a sync period for the plurality of anchors to synchronize a start of the contention-free period with each other and an ending period. In some implementations, the contention-free period of the MAC frame structure can be partitioned into a plurality of time slots for transmitting TDOA ranging packets. In some implementations, the MAC frame structure can further include a respective guard interval between successive time slots of the contention-free period.

In some implementations, the method can further include grouping the plurality of anchors into a plurality of anchor pairs. Each anchor pair of the plurality of anchor pairs can include at least two anchors of the plurality of anchors. Each anchor pair can be assigned to a respective one of the plurality of time slots in the contention-free period. The method can further include, during each of the plurality of time slots, for each pair of anchors transmitting, by a first anchor, a range request (REQ) packet. The method can further include transmitting, by a second anchor, a range response (RSP) packet, responsive to receiving the REQ packet. The method can further include calculating, by the mobile device, a time difference between receiving the RSP packet and the REQ packet. The method can further include estimating, by a position estimator, the position of the mobile device based on the time differences from at least three anchor pairs.

In some implementations, the method can include transmitting, by the mobile device during the contention period of the MAC frame structure, a first range request (REQ) packet to be received by at least a first subset of the plurality of anchors. The method can further include transmitting, by at least one anchor of the subset of the plurality of anchors, a respective range response (RSP) packet to be received by at least a second subset of the plurality of anchors, responsive to receiving the REQ packet. In some implementations, the at least one anchor may transmit the RSP packet only during the contention period. The method can further include calculating, by each anchor included in both the first subset and the second subset, a time difference between receipt of the REQ packet and receipt of the RSP packet. The method can further include estimating, by a position estimator, the position of the mobile device based on the time differences.

In some implementations, the method can further include, during the contention period of the MAC frame structure, for each anchor of at least a subset of the plurality of anchors, transmitting, by the mobile device, a range request (REQ) packet to the anchor. The method can further include transmitting, by the anchor, a range response (RSP) packet to the mobile device, responsive to receiving the REQ packet. The method can further include calculating, by the mobile device, a time difference between receiving the RSP packet from the anchor and transmitting the REQ packet. The method can further include estimating, by the mobile device, a distance between the mobile device and the anchor. The method can further include estimating, by the position estimator, the position of the mobile device based on the distances between the mobile device and at least three anchors.

In some implementations, the method can further include, during the contention period of the MAC frame structure, transmitting, by each anchor of the plurality of anchors, a respective ranging request (REQ) packet to the mobile device. The method can further include transmitting, by the mobile device, respective ranging response (RSP) packets to each anchor of the plurality of anchors, responsive to receiving the respective REQ packets, to cause at least a subset of the plurality of anchors to receive the respective RSP packets. The method can further include calculating, by each anchor of the subset of anchors, a time difference between receipt of the respective RSP packet and transmission of the REQ packet. The method can further include estimating, by each anchor of the subset of anchors, a distance between the mobile device and the anchor. The method can further include estimating, by the position estimator, the position of the mobile device based on the distances between the mobile device and at least three anchors.

This disclosure provides a MAC frame structure and a data communication method for use in a real-time localization system (RTLS). The MAC frame structure described herein can be used for different ranging methods, such as two-way time of arrival (TW-TOA), downlink time difference of arrival (DL-TDOA), and uplink time difference of arrival (UL-TDOA). In addition, the MAC frame structure described in this disclosure can also support synchronization among anchors in the system and can provide capability for generic data communication (e.g., data packets that may not be used for ranging purposes).

To achieve these and other technical advantages, as embodied and broadly described herein, a MAC frame structure in a RTLS can include at least a beacon period (BP), a contention-free period (CFP), and a contention period (CP). In addition, this disclosure provides a data communication method in a RTLS, including the types of packets and steps for transmitting and receiving such packets in each period of the MAC frame structure.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

Figure 1:
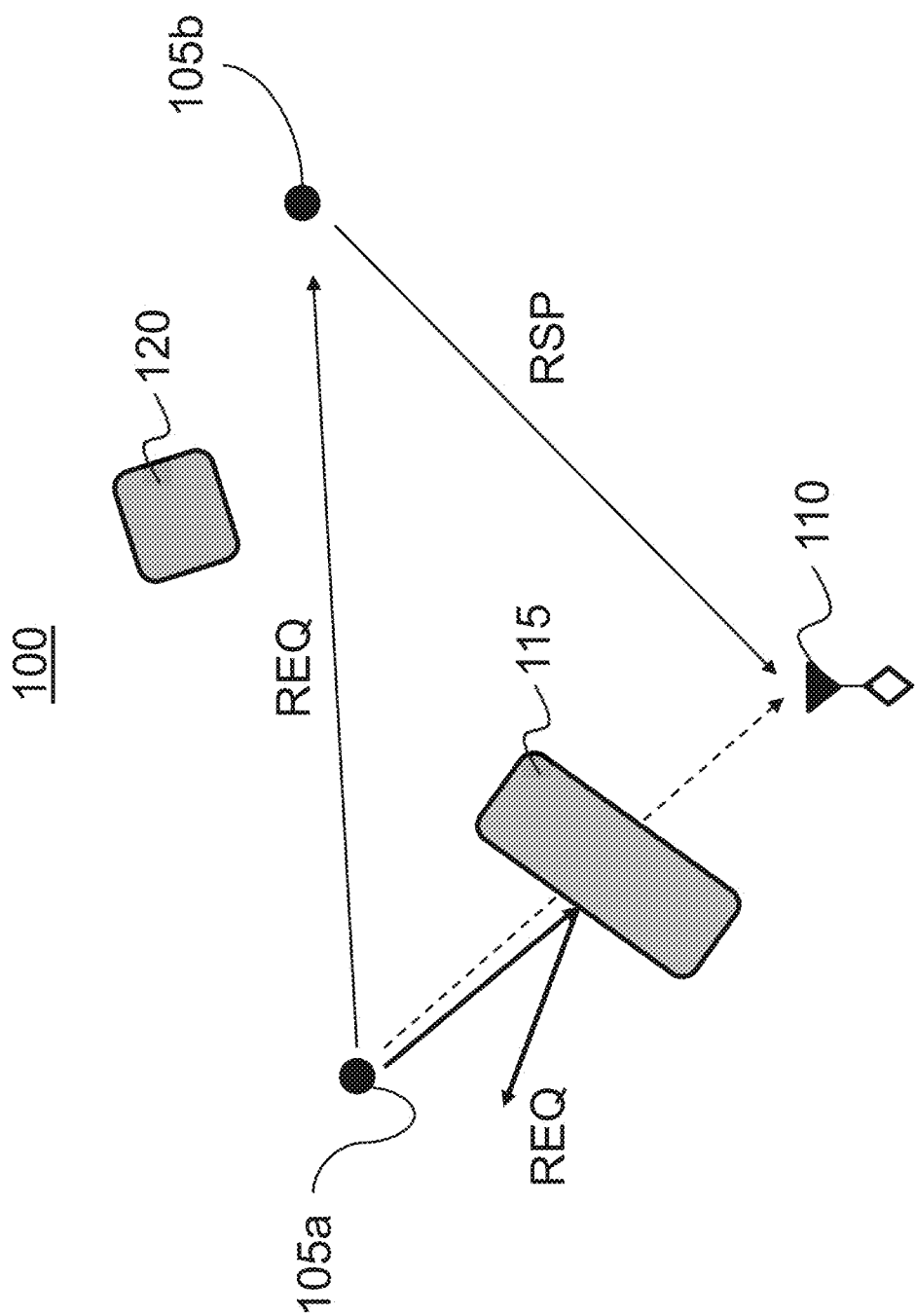
FIG. 1 illustrates a block diagram of an example system for locating a position of a target object, according to an illustrative implementation.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

A real-time localization system (RTLS) is a wireless system or network that may use RF signals to provide real-time updates on locations of mobile devices in the system. Such a system can consist of multiple wireless devices at known locations. The devices can be referred to herein as "anchors." Depending on the physical technology used in the system, different ranging and/or angulating methods may be used to determine location.

Some ranging techniques can make use of a "time of flight," which may also be referred to herein as a time of arrival (TOA). TOA based location estimation can be carried out using trilateration. For example, the location of a mobile device can be estimated based on the distances between the mobile device and one or more anchors. In some implementations, because the mobile device is not synchronized to the anchors, the distance between the mobile device and an anchor may be estimated using a round-trip flight time. For example, a first device (e.g., either the mobile device or the anchor) transmits a first ranging packet. After receiving the first ranging packet, the second device can transmit a second ranging packet back to the first device. The round-trip time can be defined as the time elapsed between the reception of the second ranging packet and the transmission of the first ranging packet, which can be estimated by the first device. Such a technique is also referred to herein as Two-Way TOA (TW-TOA).

Other ranging techniques can make use of a "time difference of flight," which can also be referred to herein as time difference of arrival (TDOA). TDOA based location estimation can be carried out using multilateration. In some TDOA based on location estimations, by measuring the time difference at the mobile device of two ranging packets received from a pair of anchors, the distance difference from the mobile device and each of the two anchors can be estimated. This distance difference can be used in the location estimation of the mobile device. This technique can be referred to herein as downlink TDOA (DL-TDOA) because the ranging packets are transmitted from anchors to the mobile device. In some other TDOA based location estimations, the mobile device can send out a ranging packet to anchors. Some of the anchors may reply with another ranging packet when they receive the ranging packet from the mobile device. Some of the anchors may receive both ranging packets. Therefore, these anchors may measure time differences between these ranging packets and thus use them to estimate the location of the mobile device. This technique can be referred to herein as uplink TDOA (UL-TDOA) because the first ranging packet is transmitted from the mobile device to the anchors.

Because ranging packets are transmitted over the air (e.g., the packets access the same media) in the network, a media access control (MAC) scheme can be designed to support localization service for mobile devices in the network. This disclosure provides such a scheme. The scheme can be different from MAC schemes used in other wireless networks, such as those that are used primarily for generic data communication. For example, the MAC scheme for RTLS may be used for different ranging methods such as TOA and TDOA. In addition, because ranging methods rely on time or time differences between ranging packets, carefully controlling media access of the ranging packets in a MAC scheme can help minimize errors in estimating time or time difference, which can be useful in localization accuracy of a RTLS. Existing MAC frame structures and data communication techniques that are typically used for generic wireless data communication may not be designed with these considerations in mind for localization functionality. To address this technical challenge, this disclosure provides an improved MAC frame structure and data communication technique that can improve accuracy and efficiency of location estimation for a RTLS.

In some implementations, a MAC frame structure in an RTLS according to the present disclosure can include at least a beacon period (BP), a contention-free period (CFP), and a contention period (CP). The MAC frame structure may also include additional periods, such as a sync period after the BP and an end period at the end of the frame. This disclosure provides details relating to each of these periods, including data communication methods in each period.

FIG. 1 illustrates a block diagram of an example system 100 for locating a position of a target object 110, according to an illustrative implementation. The system 100 includes a pair of anchors 105a and 105 (generally referred to as anchors 105) configured to communicate with one another and with the target object 110. The system 100 also includes a position estimator 120. Also depicted is an obstacle 115 that obstructs a line of sight (LOS) path between the anchor 105*a* and the target object 110. The system 100 can be used, for example, to determine a location of the target object 110 via a ranging technique, such as a TOA based location estimation or a TDOA based location estimation. The positions of the anchors 105 may be known, and RF communications may be transmitted between the anchors 105 and the target 110. Based on the timing of such communications, the location of the target object 110 can be estimated. In some implementations, timing information can be sent from the anchors 105 to the position estimator 120, and the position estimator 120 can use the timing information to estimate the position of the target object 110. Stated differently, the position estimator may be remote from the anchors 105 and from the target object 110. For example, the position estimator 120 may be a remote server or other type of computing device. In some other implementations, the position estimator may be integrated into or otherwise collocated with at least one of the anchors 105 or with the target object 110. In some implementations, the target object 110 may be a mobile device. In some implementations, the target object 110 may be a mobile computing device, such as a smartphone or a tablet computing device.

In one example, the anchor 105*a* can initiate the ranging process by sending out a REQ packet. The REQ packet can be received by the anchor 105*b*, which can respond with a RSP packet. Without the obstacle 115, the target object 110 within the transmission ranges of both the anchor 105*a* and the anchor 105*b* could receive both REQ and RSP packets. However, the obstacle 115 blocks the LOS signal path between the anchor 105*a* and target object 110. Thus, the target object 110 may not be able to receive the REQ packet from the anchor 105*a*. As a result, the target object 110 may not be able to complete the calculation of time difference of arrival between the RSP packet and the REQ packet to be used for estimation of the location of the target object 110 based on TDOA. Such a system may use other techniques to compensate for the obstacle 115, or may include more anchors 105 than are shown. For example, by including a large number of anchor pairs similar to the anchor pair that includes the anchors 105*a* and 105*b*, the system 100 can be more likely to have multiple anchor pairs with LOS paths to the target object 110. In order to facilitate communications in such a system, it can be useful to design a MAC frame structure that allows the anchors 105 to synchronize with one another and that reduces the likelihood of packet collisions. One such example MAC frame structure is described below in connection with FIG. 2.

Figure 2:
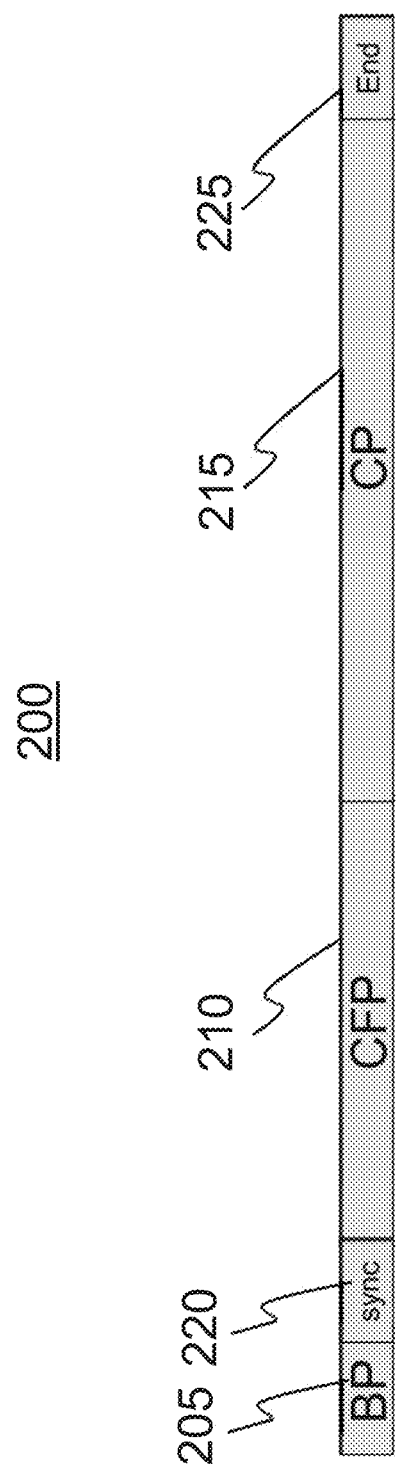
FIG. 2 illustrates an example MAC frame structure that can be used for communications in the system of FIG. 1, according to an illustrative implementation.

FIG. 2 illustrates an example MAC frame structure 200 that can be used for communications in the system 100 of FIG. 1, according to an illustrative implementation. The MAC frame structure 200 can include a beacon period (BP) 205, a contention-free period (CFP) 210, and a contention period (CP) 215. In some implementations, the BP 205 can be used for anchors exchanging beacon signals to synchronize the clocks across different anchors. In some implementations, the CFP 210 can be used to schedule the transmissions of DL-TDOA ranging packets to avoid collisions among those packets. In some implementations, the CP 215 can be used to support UL-TDOA, TW-TOA ranging packets, and additional data packets or control signaling packets the system 100 of FIG. 1. The MAC frame structure 200 may also optionally include additional periods. For example, the MAC frame structure 200 may optionally include a sync period 220 and an ending period 225. In some implementations, the sync period 220 can be a short buffer period for anchors to synchronize the start of CFP 210 to each other after they have corrected their local clocks using their respective beacon signals. At the end of each frame, the ending period 225 may be a short buffer period reserved for additional operations or packets that may help for completing a frame, such as any operations or packets that can help to coordinate next frame preparation, a guard interval for any acknowledgement (ACK) packets, etc. In some implementations, either of the sync period 220 and the ending period 225 may be omitted from the MAC frame structure 200.

Figure 3:
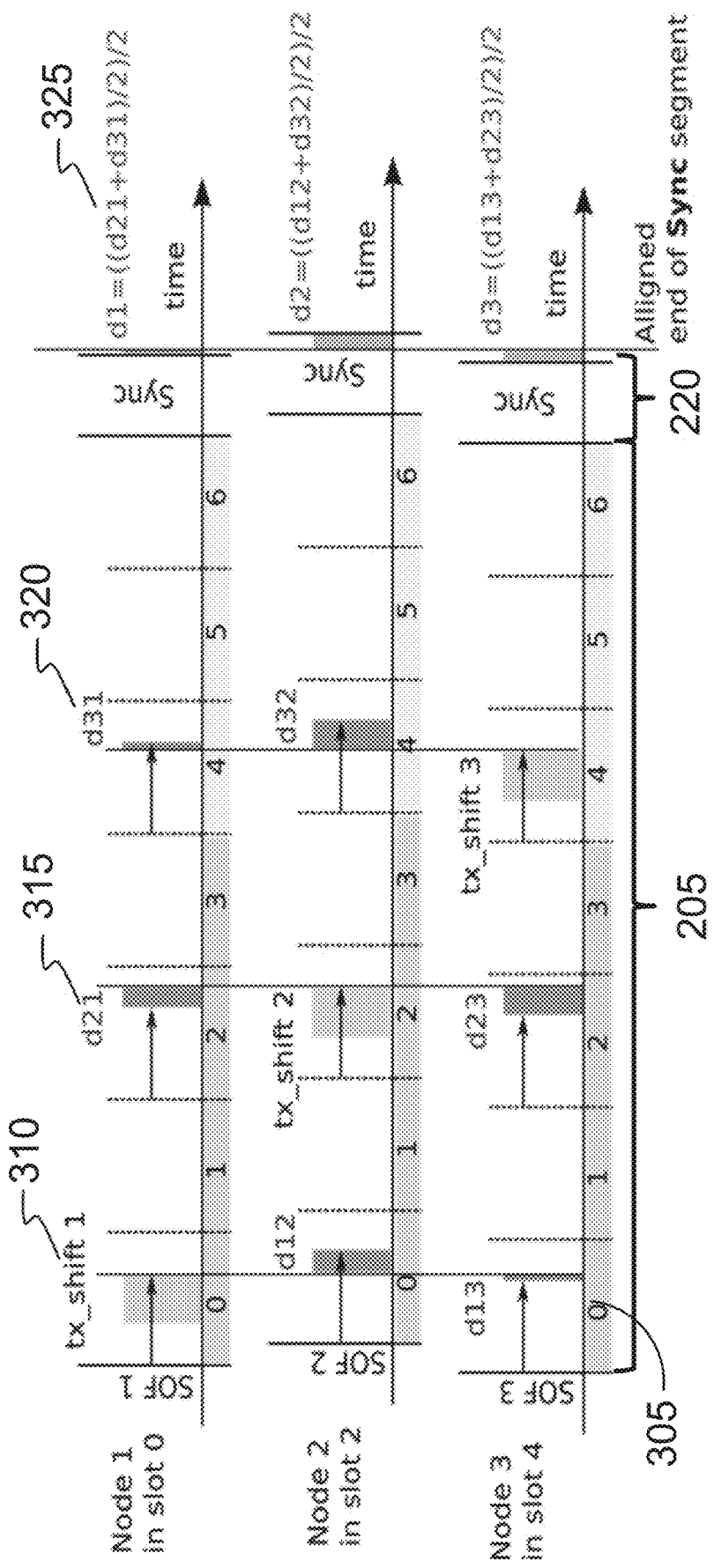
FIG. 3 illustrates an example data communication technique that can be used in a beacon period (BP) of a MAC frame structure, according to an illustrative implementation.

FIG. 3 illustrates an example data communication technique that can be used in a beacon period (BP) of a MAC frame structure, according to an illustrative implementation. For example, the data communication technique shown in FIG. 3 can be used during the BP 205 the MAC frame structure 200 shown in FIG. 2. In some implementations, the data communication technique illustrated in FIG. 3 can be used to synchronize the clocks of different anchors. For example, FIG. 3 shows the data packets transmitted by three anchors, labeled Node 1, Node 2, and Node 3. The BP 205 can be partitioned into a number of small periods called slots 305 for transmission of beacon signals. An anchor may transmit its own beacon signal in a certain slot 305, and may receive a beacon signal from its neighboring anchors in other slots 305. In the example of FIG. 3, neighboring anchors can be defined as anchors which are in the transmission range of each other and can receive the packets from each other. As illustrated, the anchor Node 1 can transmit its beacon signal in slot 0. The anchor Node 1 can measure the time shift 310 between the completion of its beacon signal transmission and the start of the time slot. In slot 2 and slot 4, the anchor Node 1 can receive beacon signals from anchor Node 2 and anchor Node 3, respectively.

In some implementations, when the anchor Node 1 receives a beacon signal, it can measure the time shift between the completion of receiving the beacon signal and the start of the time slot. The anchor Node 1 can then compare this time shift to the time shift 310 to determine the difference. In the example of FIG. 3, the difference between the time shift of receiving the beacon signal from anchor Node 2 and the time shift 310 is d21 (315), and the difference between the time shift of receiving the beacon signal from anchor Node 3 and the time shift 310 is d31 (320). The anchor Node 1 may use these time difference values to make a correction or other adjustment to its own clock signal so that it can be synchronized with the other anchors. For example, in FIG. 3, d1 can represent the local time at the anchor Node 1, d2 can represent the local time at the anchor Node 2, and d3 can represent the local time at the anchor Node 3. Timestamp differences from neighboring anchor nodes are shown in FIG. 3 as d12 (e.g., the timestamp difference of the anchor Node 1 relative to the anchor Node 2), d21 (e.g., the timestamp difference of the anchor Node 2 relative to the anchor Node 1), d31 (e.g., the timestamp difference of the anchor Node 3 relative to the anchor Node 1), d13 (e.g., the timestamp difference of the anchor Node 1 relative to the anchor Node 3), d23 (e.g., the timestamp difference of the anchor Node 2 relative to the anchor Node 3), and d32 (e.g., the timestamp difference of the anchor Node 3 from the anchor Node 2). An example formula 325 for the anchor Node 1 to adjust its clock signal (e.g., shift its local time relative to d1) can be $d1=((d21+d32)/2)/2$, as shown in FIG. 3. Each other anchor can also perform a similar clock correction based on the time difference values that it has received from its neighboring anchors. For example, the formulate for the anchor Node 2 to adjust its clock signal can be represented as $d2=((d12+d32)/2)/2$, and the formulate for the anchor Node 3 to adjust its clock signal can be represented as $d3=((d13+d23)/2)/2$. In some implementations, after a subsequent buffer period (e.g., the sync period 220) based on the correction, the CFP 210 can begin.

Figure 4:
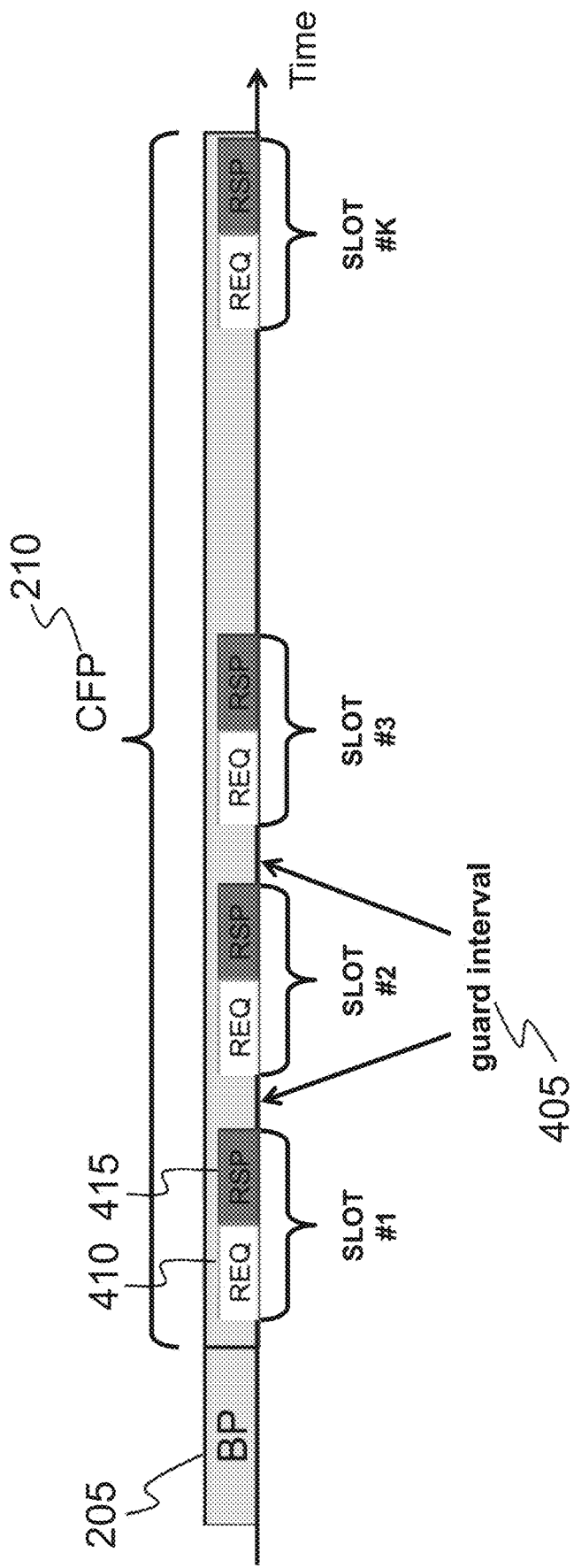
FIG. 4 illustrates an example data communication technique that can be used in a contention-free period (CFP) of a MAC frame structure to support DL-TDOA.

FIG. 4 illustrates an example data communication technique that can be used in a contention-free period (CFP) of a MAC frame structure to support DL-TDOA. For example, the data communication technique shown in FIG. 4 can be used during the CFP 210 of the MAC frame structure 200 shown in FIG. 2. The CFP 210 can be partitioned into a number of slots, with a separation period referred to as a guard interval 405 between the slots. Each slot can be assigned to a respective pair of anchors in the DL_TDOA ranging process, and can accommodate two ranging packets from the anchor pair. In some implementations, one anchor in the pair sends a first ranging packet called a range request (REQ) packet 410 to the second anchor. After receiving the REQ packet 410, the second anchor in the pair can send a second ranging packet called a range response (RSP) packet 415. A mobile device can also receive both the REQ packet 405 and the RSP packets 415. In some implementations, the mobile device can be an object whose position is desired to be known, similar to the target object 110 shown in FIG. 1. The mobile device may calculate the time difference between receiving these two packets. In some implementations, the duration of CFP 210 can be selected to contain a number of slots to support the ranging process of all anchor pairs in the system. The mobile device can estimate its location in space based on receiving REQ packets 410 and RSP packets 415 from a plurality of anchor pairs. For example, receiving REQ packets 410 and RSP packets 415 from at least three anchor pairs may be sufficient for the mobile device to estimate its location in two-dimensional (2D) space, while receiving REQ packets 410 and RSP packets 415 from at least four anchor pairs may be sufficient for the mobile device to estimate its position in three-dimensional (3D) space using a TDOA based approach.

Figure 5:
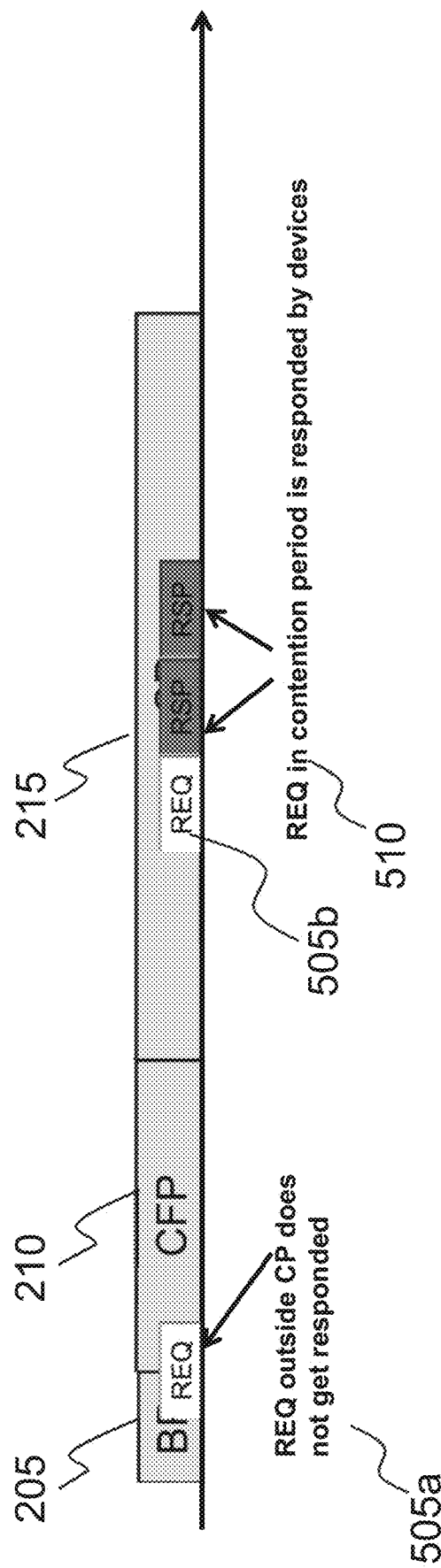
FIG. 5 illustrates an example data communication technique that can be used in a contention period (CP) of a MAC frame structure to support UL-TDOA.

FIG. 5 illustrates an example data communication technique that can be used in a contention period (CP) of a MAC frame structure to support UL-TDOA. For example, the data communication technique shown in FIG. 5 can be used during the CP 215 of the MAC frame structure 200 shown in FIG. 2. A mobile device may initiate the ranging process by sending a first REQ packet. Before it sends the REQ packet, the mobile device may sense the channel and may use a transmission back-off scheme to reduce the possibility of collision with other transmissions. Because the mobile device may transmit the REQ packet anytime in the frame, an REQ packet such as the REQ packet 505a that is not transmitted during the CP 215 will not be responded to by other anchors. When the mobile device transmits an REQ packet such as REQ packet 505b that is transmitted in the CP 215 and received by some of anchors, one or more anchors may respond with a RSP packet (510). Anchors which have received both the REQ packet 505b and either of the RSP packets 510 may calculate the time difference between receiving RSP and REQ packets. These time difference values may be sent, for example, to an anchor or an external server for the location calculation of the mobile device. The device that performs the calculation can be referred to as, or can include, a position estimator.

Figure 6:
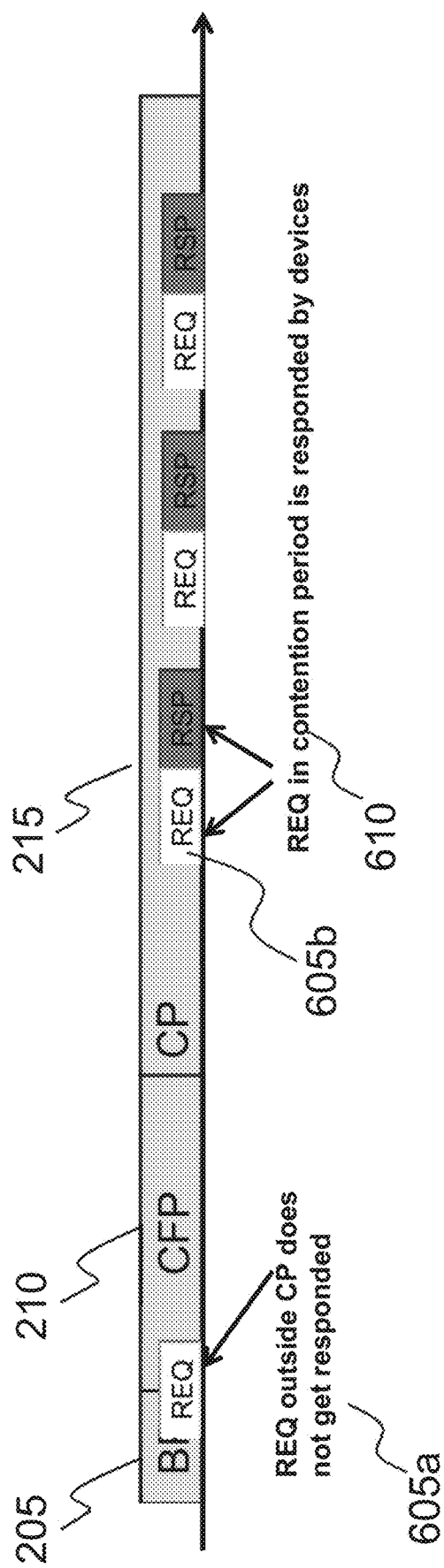
FIG. 6 illustrates an example data communication technique that can be used in a contention period (CP) of a MAC frame structure to support TW-TOA.

FIG. 6 illustrates an example data communication technique that can be used in a contention period (CP) of a MAC frame structure to support TW-TOA. For example, the data communication technique shown in FIG. 6 can be used during the CP 215 of the MAC frame structure 200 shown in FIG. 2. In some implementations, a mobile device may initiate the ranging process by sending a first REQ packet to an anchor. Before it sends the REQ packet, it may sense the channel and use certain transmission back-off scheme to reduce the possibility of collision with other transmissions. Since a mobile device may transmit the REQ packet anytime in the frame, an REQ packet such as the REQ packet 605a that is not in transmitted within the CP 215 will not be responded to by the anchor. When an REQ packet such as the REQ packet 605b is transmitted during the CP 215 and received by the anchor, the anchor will respond with a RSP packet 610. When the mobile device has received the RSP packet 610, it can calculate the time difference between receiving the RSP packet 610 and transmitting the REQ packet 605b. The mobile device can use this time difference value to determine the distance between its location and the anchor. The mobile device may repeat this TW-TOA ranging process with different anchors during the CP 215. The mobile device can estimate its location in space based on time differences for a plurality of anchor pairs. For example, calculating such time differences from at least three anchor pairs may be sufficient for the mobile device to estimate its location in 2D space, and calculating such time differences from at least four anchor pairs may be sufficient for the mobile device to estimate its position in 3D space using TOA based approach.

In some other implementations, the data communication technique depicted in FIG. 6 may be initiated by anchors, instead of by the mobile device. For example, anchors may send out REQ packets. When a mobile device receives some of these REQ packets, it can respond with an RSP packet for each received REQ packet. An anchor that has received an RSP packet from the mobile device can calculate the time difference between the RSP and its REQ packet, and can use that information to determine a distance from the anchor to the mobile device. These time difference values may be collected from multiple anchors and sent to one anchor or an external server for the location calculation of the mobile device. The device that performs the calculation can be referred to as, or can include, a position estimator.

Figure 7:
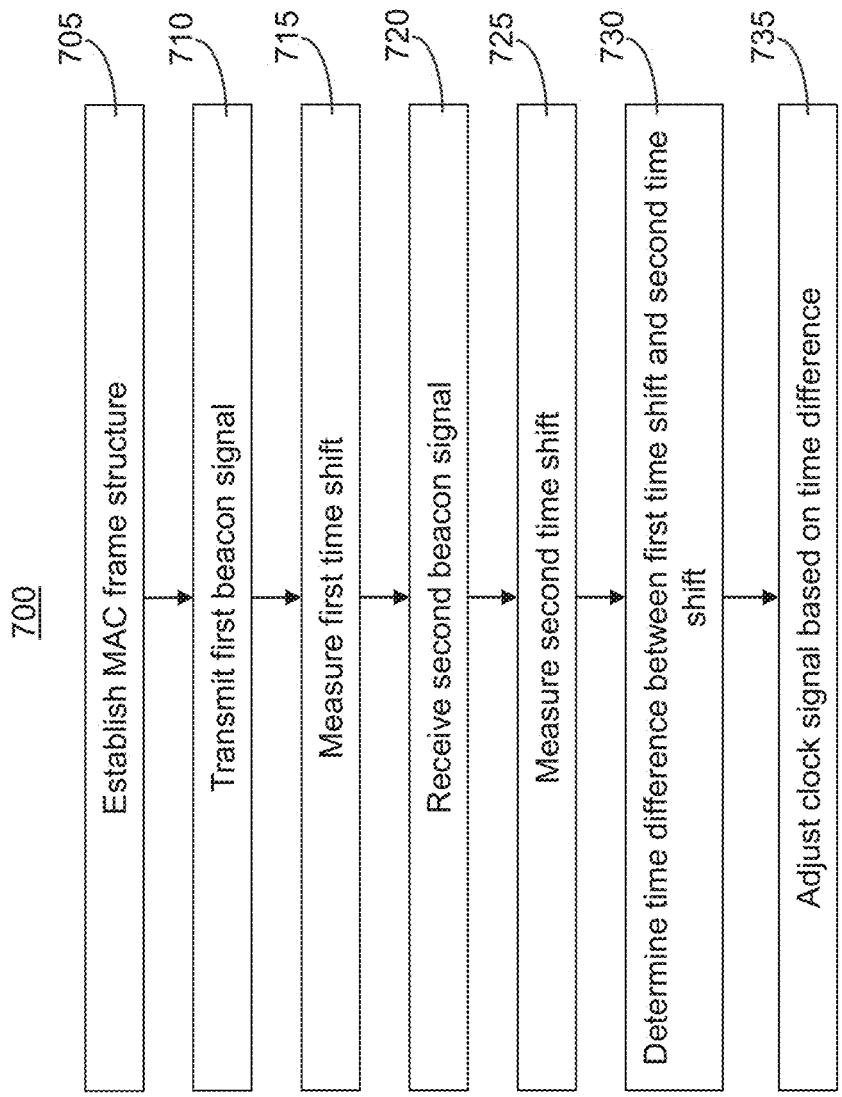
FIG. 7 illustrates a flowchart of an example method for synchronizing clocks among anchors in a system for locating a position of a mobile device.

FIG. 7 illustrates a flowchart of an example method 700 for synchronizing clocks among anchors in a system for locating a position of a mobile device. The method 700 can include establishing a media access control (MAC) frame structure (block 705). The MAC frame structure can be designed to accommodate transmission of data packets between the plurality of anchors and the mobile device. In some implementations, the MAC frame structure can include a beacon period for synchronizing the plurality of anchors. The beacon period of the MAC frame structure can be partitioned into a plurality of time slots for transmitting a beacon signal. In some implementations, the MAC frame structure can also include a contention-free period. In some implementations, the MAC frame structure can also include a contention period.

The method 700 can include transmitting a first beacon signal (block 710). In some implementations, the first beacon signal can be transmitted by a first anchor of the plurality of anchors to a second anchor. The first anchor and the second anchor can together form an anchor pair. In some implementations, the first anchor can transmit the first beacon signal during a first time slot of the beacon period. The first time slot can be reserved for the first anchor, such that no beacon signals are expected to be transmitted during the first time slot.

The method 700 can include measuring a first time shift (block 715). In some implementations, the time first shift can be measured by the first anchor. In some implementations, the first time shift can correspond to a duration of time between transmission of the first beacon signal and a start of the first time slot.

The method 700 can include receiving a second beacon signal (block 720). In some implementations, the second beacon signal can be received by the first anchor, and can be received from a second anchor. The second anchor can be configured to transmit the second beacon signal during a second time slot of the beacon period of the MAC frame structure. For example, the second time slot can be reserved for the second anchor.

The method 700 can include measuring a second time shift (block 725). In some implementations, the second time shift can also be measured by the first anchor. In some implementations, the second time shift can correspond to a duration of time between receiving the second beacon signal and a start of the second time slot.

The method 700 can include determining a time difference between the first time shift and the second time shift (block 730). In some implementations, the determination can be made by the first anchor. The time difference can correspond to an effective offset between the clock signals of the first anchor and the second anchor. For example, the first anchor and the second anchor may be spatially separated from one another, and may each include an independent clock signal used by one or more processors on each of the first and second anchors. The clock signals on the first and second anchors can therefore be asynchronous.

The method 700 can include adjusting a clock signal based on the time difference (block 735). The clock signal can be the clock signal used by the first anchor, and can be adjusted to account or compensate for the time difference determined at block 730. Because the time difference can correspond to an effective offset between the clock signals of the first anchor and the second anchor, the adjustment made to the clock signal of the first anchor at block 735 can synchronize the clock signal of the first anchor with the clock signal of the second anchor. In some implementations, the steps of the method 700 can also be performed by additional pairs of anchors included in the system, such that the anchors may become synchronized across the system. The anchors can then communicate with the mobile device to perform one or more ranging operations to determine a position of the mobile device. In some implementations, such communications may be carried out during the remaining periods of the MAC frame structure, such as the contention-free period and the contention period.

The MAC frame structures and communication methods described in this disclosure can enable the dedicated support of different ranging methods for locating mobile devices in a RTLS, as compared with existing MAC frame structures that may be used primarily for generic data communication. In addition, the MAC frame structures described herein can enable synchronization among distributed anchors, which can be useful in various ranging methods for locating mobile devices in a RTLS.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed is:

1. A system for locating a position of a mobile device, the system comprising:
   a plurality of anchors, each anchor positioned at a known location, the plurality of anchors configured to communicate with one another and with the mobile device by transmitting data packets formatted according to a media access control (MAC) frame structure comprising:
   a beacon period for synchronizing the plurality of anchors in the system via transmission of a first set of communication packets;
   a contention-free period; and
   a contention period; and
   a position estimator configured to estimate the position of the mobile device;
   wherein at least one of the plurality of anchors is configured to:
   transmit a first beacon signal in a first time slot;
   measure a first time shift between transmission of the first beacon signal and a start of the first time slot;
   receive a second beacon signal from a second anchor transmitted during a second time slot;
   measure a second time shift between receiving the second beacon signal and a start of the second time slot;
   determine a time difference between the first time shift and the second time shift; and
   adjust a clock signal of the first anchor based on the time difference.

2. The system of claim 1, wherein the MAC frame structure further comprises:
a sync period for the plurality of anchors to synchronize a start of the contention-free period with each other; and
an ending period.

3. The system of claim 1, wherein the beacon period of the MAC frame structure is partitioned into a plurality of time slots for transmitting a beacon signal.

4. The system of claim 1, wherein the contention-free period of the MAC frame structure is partitioned into a plurality of time slots for transmitting TDOA ranging packets.

5. The system of claim 4, wherein the MAC frame structure further comprises a respective guard interval between successive time slots of the contention-free period.

6. The system of claim 4, wherein the plurality of anchors are grouped into a plurality of anchor pairs, each anchor pair of the plurality of anchor pairs including at least two anchors of the plurality of anchors, each anchor pair assigned to a respective one of the plurality of time slots, wherein, during each of the plurality of time slots:
a first anchor is configured to transmit a range request (REQ) packet;
a second anchor is configured to transmit a range response (RSP) packet, responsive to receiving the REQ packet; and
the mobile device is configured to calculate a time difference between receiving the RSP packet and the REQ packet; and
wherein the position estimator is configured to estimate the position of the mobile device based on the time differences from at least three anchor pairs.

7. The system of claim 1, wherein:
the mobile device is configured to transmit a first range request (REQ) packet to be received by at least a first subset of the plurality of anchors;
at least one anchor of the subset of the plurality of anchors is configured to transmit a range response (RSP) packet to be received by at least a second subset of the plurality of anchors, responsive to receiving the REQ packet;
each anchor included in both the first subset and the second subset is configured to calculate a time difference between receipt of the REQ packet and receipt of the RSP packet; and
the position estimator is configured to:
collect the time differences; and
estimate the position of the mobile device based on the time differences.

8. The system of claim 1, wherein:
during the contention period of the MAC frame structure, for each anchor of at least a subset of the plurality of anchors:
the mobile device is configured to transmit a range request (REQ) packet to the anchor;
the anchor is configured to transmit a range response (RSP) packet to the mobile device, responsive to receiving the REQ packet;
the mobile device is configured to calculate a time difference between receiving the RSP packet from the anchor and transmitting the REQ packet; and
the mobile device is configured to estimate a distance between the mobile device and the anchor; and
the position estimator is configured to estimate the position of the mobile device based on the distances between the mobile device and at least three anchors.

9. The system of claim 1, wherein:
during the contention period of the MAC frame structure, each anchor of the plurality of anchors is configured to transmit a respective ranging request (REQ) packet to the mobile device;
the mobile device is configured to transmit respective ranging response (RSP) packets to each anchor of the plurality of anchors, responsive to receiving the respective REQ packets, to cause at least a subset of the plurality of anchors to receive the respective RSP packets;
each anchor of the subset of anchors is configured to:
calculate a time difference between receipt of the respective RSP packet and transmission of the REQ packet; and
estimate a distance between the mobile device and the anchor; and
the position estimator is configured to estimate the position of the mobile device based on the distances between the mobile device and at least three anchors.

10. A method for locating a position of a mobile device in a network of a plurality of anchors at known locations, the method comprising:
establishing a media access control (MAC) frame structure for transmitting data packets between the plurality of anchors and the mobile device, the MAC frame structure comprising:
a beacon period for synchronizing the plurality of anchors, the beacon period of the MAC frame structure is partitioned into a plurality of time slots for transmitting a beacon signal;
a contention-free period; and
a contention period; and
transmitting, by a first anchor of the plurality of anchors, a first beacon signal in a first time slot;
measuring, by the first anchor, a first time shift between transmission of the first beacon signal and a start of the first time slot;
receiving, by the first anchor, a second beacon signal from a second anchor transmitted during a second time slot;
measuring, by the first anchor, a second time shift between receiving the second beacon signal and a start of the second time slot;
determining, by the first anchor, a time difference between the first time shift and the second time shift; and
adjusting, by the first anchor, a clock signal of the first anchor based on the time difference.

11. The method of claim 10, wherein the MAC frame structure further comprises:
a sync period for the plurality of anchors to synchronize a start of the contention-free period with each other; and
an ending period.

12. The method of claim 10, wherein the contention-free period of the MAC frame structure is partitioned into a plurality of time slots for transmitting TDOA ranging packets.

13. The method of claim 12, wherein the MAC frame structure further comprises a respective guard interval between successive time slots of the contention-free period.

14. The method of claim 12, further comprising:
grouping the plurality of anchors into a plurality of anchor pairs, each anchor pair of the plurality of anchor pairs including at least two anchors of the plurality of anchors, each anchor pair assigned to a respective one of the plurality of time slots, the method further comprising during each of the plurality of time slots, for each pair of anchors:
transmitting, by a first anchor, a range request (REQ) packet;
transmitting, by a second anchor, a range response (RSP) packet, responsive to receiving the REQ packet; and
calculating, by the mobile device, a time difference between receiving the RSP packet and the REQ packet; and
estimating, by a position estimator, the position of the mobile device based on the time differences from at least three anchor pairs.

15. The method of claim 10, further comprising:
transmitting, by the mobile device, a first range request (REQ) packet to be received by at least a first subset of the plurality of anchors;
transmitting, by at least one anchor of the subset of the plurality of anchors, a respective range response (RSP) packet to be received by at least a second subset of the plurality of anchors, responsive to receiving the REQ packet;
calculating, by each anchor included in both the first subset and the second subset, a time difference between receipt of the REQ packet and receipt of the RSP packet; and
estimating, by a position estimator, the position of the mobile device based on the time differences.

16. The method of claim 10, further comprising:
during the contention period of the MAC frame structure, for each anchor of at least a subset of the plurality of anchors:
transmitting, by the mobile device, a range request (REQ) packet to the anchor;
transmitting, by the anchor, a range response (RSP) packet to the mobile device, responsive to receiving the REQ packet;
calculating, by the mobile device, a time difference between receiving the RSP packet from the anchor and transmitting the REQ packet; and
estimating, by the mobile device, a distance between the mobile device and the anchor; and
estimating, by the position estimator, the position of the mobile device based on the distances between the mobile device and at least three anchors.

17. The method of claim 10, further comprising:
during the contention period of the MAC frame structure, transmitting, by each anchor of the plurality of anchors, a respective ranging request (REQ) packet to the mobile device;
transmitting, by the mobile device, respective ranging response (RSP) packets to each anchor of the plurality of anchors, responsive to receiving the respective REQ packets, to cause at least a subset of the plurality of anchors to receive the respective RSP packets;
calculating, by each anchor of the subset of anchors, a time difference between receipt of the respective RSP packet and transmission of the REQ packet;
estimating, by each anchor of the subset of anchors, a distance between the mobile device and the anchor; and
estimating, by the position estimator, the position of the mobile device based on the distances between the mobile device and at least three anchors.

* * * * *